United States Patent
Hall et al.

(10) Patent No.: US 11,629,258 B2
(45) Date of Patent: Apr. 18, 2023

(54) ENERGY CURABLE INKJET INKS FOR THE PRODUCTION OF LAYERED COMPOSITES

(71) Applicant: SUN CHEMICAL CORPORATION, Parsippany, NJ (US)

(72) Inventors: Stephen Anthony Hall, Wells (GB); Thomas Michael Budden, Plymouth (GB)

(73) Assignee: Sun Chemical Corporation, Parsippany, NJ (US)

( * ) Notice: Subject to any disclaimer, the term of this patent is extended or adjusted under 35 U.S.C. 154(b) by 296 days.

(21) Appl. No.: 15/571,184

(22) PCT Filed: May 4, 2016

(86) PCT No.: PCT/US2016/030653
§ 371 (c)(1),
(2) Date: Nov. 1, 2017

(87) PCT Pub. No.: WO2016/179213
PCT Pub. Date: Nov. 10, 2016

(65) Prior Publication Data
US 2019/0085188 A1    Mar. 21, 2019

Related U.S. Application Data

(60) Provisional application No. 62/158,117, filed on May 7, 2015.

(51) Int. Cl.
*C09D 11/101*    (2014.01)
*C09D 4/00*    (2006.01)
(Continued)

(52) U.S. Cl.
CPC ......... *C09D 11/101* (2013.01); *B41M 5/0023* (2013.01); *B41M 5/502* (2013.01);
(Continued)

(58) Field of Classification Search
CPC ........ C09D 11/30; C09D 4/00; C09D 11/101; C09D 11/107; C09D 11/38; B41M 5/0023; B41M 5/502; C08F 220/20
See application file for complete search history.

(56) References Cited

U.S. PATENT DOCUMENTS

| 5,629,359 A * | 5/1997 | Peeters .................... C09D 4/00 |
| | | 522/96 |
| 8,952,190 B2 * | 2/2015 | Davidson .............. C07C 229/18 |
| | | 560/43 |

(Continued)

FOREIGN PATENT DOCUMENTS

| CN | 101 952 430 A | 2/2011 |
| EP | 2799502 A | 11/2014 |

(Continued)

OTHER PUBLICATIONS

International Search Report issued in International Application No. PCT/US16/30653 dated Aug. 8, 2016.

(Continued)

*Primary Examiner* — Christopher M Polley
*Assistant Examiner* — Sathavaram I Reddy
(74) *Attorney, Agent, or Firm* — Marian E. Fundytus; Ostrolenk Faber LLP.

(57) ABSTRACT

Described is an energy curable ink for use in the production of layered composites the ink comprising 3 to 50% by weight of aminoacrylate as defined herein, 5 to 60% by weight of hydroxyl functional acrylate monomer and wherein the non-volatile content of the ink is not less than 45% by weight. Also described is a layered composite having a layer of the energy curable ink on a substrate and a process for producing a layered composite in which the energy curable ink according to the present invention is printed onto a substrate and then cured.

19 Claims, 2 Drawing Sheets

← Thick steel press plate
← Thin steel press plate
← Release paper
← Overlay sheet
← Printed paper
← Underlay sheet
← MDF board edged with Al foil tape
← Overlay sheet
← Release paper
← Thin steel press plate
← Thick steel press plate (51) Int. Cl.
*C08F 220/20* (2006.01)
*C09D 11/30* (2014.01)
*B41M 5/00* (2006.01)
*B41M 5/50* (2006.01)
*C09D 11/107* (2014.01)
*C09D 11/38* (2014.01)

(52) U.S. Cl.
CPC .............. *C08F 220/20* (2013.01); *C09D 4/00* (2013.01); *C09D 11/107* (2013.01); *C09D 11/30* (2013.01); *C09D 11/38* (2013.01)

(56) References Cited

U.S. PATENT DOCUMENTS

| | | | | |
|---|---|---|---|---|
| 2002/0136862 | A1* | 9/2002 | Dong | B32B 21/08 |
| | | | | 428/479.6 |
| 2009/0098304 | A1* | 4/2009 | Stone | C09D 133/14 |
| | | | | 427/516 |
| 2009/0159156 | A1* | 6/2009 | Walker | B27M 3/04 |
| | | | | 144/363 |
| 2009/0318611 | A1* | 12/2009 | Bergiers | G03F 7/0388 |
| | | | | 524/555 |
| 2012/0029108 | A1* | 2/2012 | Nakane | C09D 11/101 |
| | | | | 522/26 |
| 2013/0012611 | A1* | 1/2013 | Davidson | C07C 229/18 |
| | | | | 522/53 |

FOREIGN PATENT DOCUMENTS

| | | |
|---|---|---|
| JP | 2007/063521 A | 3/2007 |
| JP | 2011/195724 A | 10/2011 |
| JP | 2013/159707 A | 8/2013 |
| WO | WO-2013113553 A1 * | 8/2013 |

OTHER PUBLICATIONS

Written Opinion of the International Searching Authority issued in International Application No. PCT/US16/30653 dated Aug. 8, 2016.
International Preliminary Report issued in PCT/US2016/030653, dated Nov. 7, 2017.
Search Report issued in European Counterpart Application No. 16789966 dated Sep. 17, 2018.

* cited by examiner

ENERGY CURABLE INKJET INKS FOR THE PRODUCTION OF LAYERED COMPOSITES

CROSS REFERENCE TO RELATED APPLICATIONS

This application claims priority to U.S. Provisional Patent Application Ser. No. 62/158,117 filed May 7, 2015, which is hereby incorporated herein by reference in its entirety and for all purposes.

FIELD OF THE INVENTION

The present invention is directed to energy curable inks, in particular, digital inkjet inks that are used to prepare layered composites. The energy curable inks contain an aminoacrylate and a hydroxyl functional acrylate monomer and have a non-volatile content of at least 45% by weight.

BACKGROUND OF THE INVENTION

The present invention relates to the production of layered composites that contain ink layers that are principally used in the Décor market, and in particular those produced by continuous pressing double belt technology to manufacture melamine faced chipboard (MFC) which is used for laminate flooring, melamine boards, furniture components and kitchen work surfaces.

Laminate products are typically formed using compression methods such as high pressure laminates (HPL) and continuous pressed laminates (CPL) which are used along with double belt technology to manufacture melamine faced chipboard. Furthermore short cycle melamine presses may also be used to manufacture laminate flooring and various laminate products.

Different lamination processes are used with HPL and CPL compression technology and with the short cycle melamine press and these include direct lamination, impregnation using melamine impregnated papers and the use of liquid melamine solutions.

Direct lamination initially involves printing inks, either digitally or by other printing techniques, onto medium density fiber (MDF) board which has been coated with a paper sheet impregnated with melamine paper. Subsequently a sheet of melamine paper overlay is then laminated on top to create a hard scratch resistant surface.

An alternative process involves the impregnation of printed decorative papers and this can be achieved using a dry pressing technique or can involve applying liquid melamine solution and then drying and pressing.

For dry pressing a stack is first prepared on MDF board. A sheet of melamine paper underlay is placed on the MDF board, the decorative paper is then placed on top and finally a sheet of melamine paper overlay is put on the decorative paper. To the whole stack pressure is then applied at a given temperature to produce a decorative surface with a hard protective coating.

Another process that can be used is liquid laminate technology whereby an image is applied to paper-laminated MDF boards and a liquid melamine coating is applied to the board. The liquid melamine is first dried and then pressed using either a double belt or short cycle press. Alternatively an image can be printed onto paper which is then passed through a melamine bath. The paper is then dried and then pressed onto an MDF board.

During the lamination process there are three major failure modes. The first is adhesive failure to the overlay where the ink remains stuck to the MDF board and there is no adhesion to the overlay which delaminates and comes away from the board. The second is cohesive ink failure where the overlay comes away from the MDF board and the ink remains on both the board and the overlay. The third is adhesive failure to the MDF board where delamination occurs and the ink remains stuck to the overlay. For an ink to be suitable for melamine impregnation there should be no delamination, bubbles or any other surface deformity.

The ability of inkjet technology to deposit materials with different chemical and physical properties has made it important and is used in many graphics applications, vehicle wraps, wide format printing, manufacture of solar panels and printed circuit boards (PCBs). It can also be used in the Décor market for printing onto decorative papers or to melamine impregnated MDF prior to lamination.

Accordingly the present invention provides improved energy curable inkjet printing inks that can be used in the above mentioned processes and that reduce the occurrence of the above mentioned failure modes.

EP 2 799 502A1 describes radiation curable ink which contains polymerizable unsaturated compounds such as (meth)acrylates and vinyl compounds that exhibit improved print quality when using the ink for the design of decor papers used in the production of laminate press materials.

Furthermore JP2007063521 describes the aminoacrylates in ultraviolet curing inkjet ink compositions.

SUMMARY OF THE INVENTION

The present invention provides an energy curable ink comprising:
(a) 3 to 50% by weight of aminoacrylate and
(b) 5 to 60% by weight of hydroxyl functional acrylate monomer and
wherein the non-volatile content of the ink is at least 45% by weight.

Additionally the present invention also provides a layered composite comprising a layer of the energy curable ink on a substrate and a process for producing a layered composite comprising a) printing the energy curable ink according to the present invention onto a substrate and b) curing the ink.

These and other objects, advantages, and features of the invention will become apparent to those persons skilled in the art upon reading the details of the methods and formulations as more fully described below.

DETAILED DESCRIPTION OF THE INVENTION

The energy curable inks according to the present invention contain between 3 to 50% by weight of one or more aminoacrylates and also contain between 5 to 60% by weight of one or more hydroxyl functional acrylate monomers. Additionally the inks have a non-volatile content that is at least 45% by weight.

It has been found that these energy curable inks exhibit significant improved lamination performance.

When using inkjet inks for melamine impregnation there are a number of factors that must be taken into consideration.

The cure speed of the ink needs to be matched to that of the press used to print the inks to avoid under or over curing of the ink given that if the ink is under-cured then cohesive failure is likely to result whilst if the ink is over-cured a loss in adhesion to either the MDF coated board or the melamine overlay may result.

The inks according to the present invention exhibit optimized adhesion to both the MDF coated board and melamine overlay to ensure that the adhesion is not too strong to the MDF board to result in delamination failure, whilst the adhesion is not only good on the overlay which would result in delamination with the ink remaining stuck to the overlay.

Furthermore during the lamination process water is produced wherein some water derives from the MDF board itself and water is also produced by the reaction of the methylol groups on the melamine paper to produce ether groups.

Consequently the porosity of the ink is also an important consideration given that if the ink is not porous enough, then the water will not be able to escape through the coating and delamination will result. However, if the ink is too porous then the film integrity will be weak and cohesive failure will result.

Additionally the volatility of the ink needs to be controlled since if the volatile components are too high, then adhesive failure will result.

Finally the inks according to the present invention are functional inks to ensure that the inks can react with the melamine impregnated paper which reduces the likelihood of delamination during the impregnation process.

The inks of the present invention comprise between 3 to 50% by weight of aminoacrylate, typically between 5 to 35% by weight, and advantageously between 10 to 30% by weight.

Preferably the aminoacrylate is produced by the reaction of an amine and an ethylenically unsaturated monomer.

The amine may be selected from anyone of ethanolamine, ethylamine, diethylamine, triethylamine, monoisopropylamine, dipropylamine, dibutylamine, n-methylethanolamine, diethanolamine, diethyl aminopropylamine(DEAPA), dimethylaminopropylaminopropylamine (DMAPAPA), 3-isopropoxypropylamine (IPOPA), 3-Methoxypropylamine (MOPA), Ethylmethylamine (EMA), Tetramethylpropylenediamine (TMPDA), Sec-Butylamine, Aminopropyldiethanolamine (APDEA) and/or Alpamine N41.

The ethylenically unsaturated monomer may be selected from anyone of propoxylated (PO3) glyceryl triacrylate (GPTA), ethoxylated trimethylolpropane triacrylate (TMPEOTA) where the level of ethoxylation varies from 3 to 20, hexanediol diacrylate (HDDA), tripropyleneglycol diacrylate (TPGDA), trimethylolpropane triacrylate (TMPTA), ethoxylated pentaerythritol tetraacrylate (PPTTA) and/or 3-methyl 1, 5-pentanediol diacrylate (MPDDA).

Suitable commercial amino acrylates include Ebecryl 80, Ebecryl 81, Ebecryl 83, Ebecryl 85, Ebecryl 841, Ebecryl Leo 10551, Ebecryl Leo 10552, EbecrylLeo10553, Ebecryl7100, EbercrylP116, CN501, CN503, CN550, CNUVA421, CN341, CN3705, CN3715, CN3735, CN3755, CN381, CN386, Pro 3261, CN384, CN584, CN554, Genomer 5142, Genomer 5161, Genomer 5275, Photomer 4771, Photomer 4779f, Photomer 4967f, Photomer 4968f, Photomer 5006f, Photomer 4775f, Photomer 5960f, Laromer LR 8996, Laromer PO 94f, Laromer LR 8997, Laromer PO 9106, Laromer PO 9104, Laromer PO 9103, Laromer PO 83f, Laromer PO 84f, Laromer LR 8869, Laromer LR 8889, Laromer PO 77f, Omnirad Ci-250, Omnilane A1230c and Desmolux Vpls 2299.

Additionally polymeric amino acrylates can also be used and may include compounds made from ethoxylated or propoxylated trimethylolpropane triacrylate, pentaerythritol triacrylate or tetraacrylate, di-pentaerythrito pentaacrylate, neopentyl glycol diacrylate or polyester/ether/ethylene glycol diacrylates reacted with amines such as ethanolamine or diethylamine.

The energy curable inks also contain between 5 to 60% by weight of hydroxyl functional acrylate monomer, preferably between 8 to 40% by weight and advantageously between 10 to 30% by weight of hydroxyl functional acrylate monomer.

The hydroxy functional acrylate monomers are preferably selected from hydroxy butyl acrylate; hydroxy ethyl acrylate; hydroxy propyl acrylate and/or caprolactone acrylate.

Furthermore the inks may also contain up to 80% by weight of monofunctional ethylenically unsaturated monomer.

Suitable monofunctional ethylenically unsaturated monomers include 2(2-ethoxyethoxy) ethyl acrylate; 2-phenoxyethyl acrylate; 2-phenoxyethyl methacrylate; $C_{12}/C_{14}$ alkyl methacrylate; $C_{16}/C_{18}$ alkyl acrylate; $C_{16}/C_{18}$ alkyl methacrylate; caprolactone acrylate; cyclic trimethylolpropane formal acrylate; ethoxylated (4) nonyl phenol acrylate; isobornyl acrylate; isobornyl methacrylate; isodecyl acrylate; lauryl acrylate; methoxy polyethylene glycol (350) monomethacrylate; $C_8/C_{10}$ alkyl acrylate; polypropylene glycol monomethacrylate; stearyl acrylate; tetrahydrofurfuryl acrylate; tetrahydrofurfuryl methacrylate; tridecyl acrylate; 2-(phenylthio)ethyl acrylate; 2-carboxyethyl acrylate; 2-hydroxy-3-phenoxypropyl acrylate; 2-isocyanato ethyl acrylate; 2-methoxyethyl acrylate; 3,3,5-trimethylcyclohexane acrylate; 4-t.butyl cyclohexyl acrylate; acrylate ester of t.butyl decanoate; acetoacetoxy ethyl acrylate; acryloyl oxyethyl hydrogen succinate; alkoxylated lauryl acrylate; alkoxylated tetrahydrofurfuryl acrylate; behenyl acrylate; benzyl acrylate; cumyl phenoxyethyl acrylate; cyclohexyl acrylate; dicyclopentanyl acrylate; dicyclopentenyloxyethyl acrylate; dicyclopentyl acrylate; diethylenglycol butyl ether acrylate; dihydrodicyclopentadienyl acrylate; dimethyl aminoethyl acrylate; ethoxylated ethyl hexyl acrylate; ethoxylated methoxy polyethylene glycol acrylate; ethoxylated phenol acrylate; ethoxylated tristyrylphenol acrylate; iso-nonyl acrylate; iso-octyl acrylate; iso-stearyl acrylate; methoxy triethylene glycol acrylate; N-(acryloyloxyethyl) hexahydrophthalimide; N-acryloylmorpholine; N-butyl 1,2 (acryloyloxy) ethyl carbamate; n-octyl acrylate; polyethylene glycol monoacrylate; polypropylene glycol monoacrylate; tripropyleneglycol monomethyl ether acrylate or acryloyl morpholine.

Additionally the inks may also contain up to 30% by weight of difunctional ethylenically unsaturated monomer. Preferably the inks have less than 20% by weight, and advantageously less than 10% by weight of difunctional ethylenically unsaturated monomer.

Furthermore the inks according to the present invention may also contain up to 10% by weight of multifunctional ethylenically unsaturated monomer. Preferably the inks have less than 5% by weight, and advantageously less than 3% by weight of multifunctional ethylenically unsaturated monomer.

However, the inks according to the present invention preferably do not contain greater than 35% by weight of difunctional ethylenically unsaturated monomers and multifunctional ethylenically unsaturated monomers combined.

Examples of suitable difunctional ethylenically unsaturated monomers and multifunctional ethylenically unsaturated monomers include 1,3-butylene glycol dimethacrylate; 1,4-butanediol dimethacrylate; 1,6 hexanediol diacrylate; 1,6 hexanediol dimethacrylate; diethylene glycol dimethacrylate; dipropylene glycol diacrylate; ethoxylated (10) bisphenol a diacrylate; ethoxylated (2) bisphenol a dimethacrylate; ethoxylated (3) bisphenol a diacrylate; ethoxylated (3) bisphenol a dimethacrylate; ethoxylated (4) bisphenol a diacrylate; ethoxylated (4) bisphenol a dimethacrylate; ethoxylated bisphenol A dimethacrylate; ethoxylated(10) bisphenol dimethacrylate; ethylene glycol dimethacrylate; polyethylene glycol (200) diacrylate; polyethylene glycol (400) diacrylate; polyethylene glycol (400) dimethacrylate; polyethylene glycol (400) dimethacrylate; polyethylene glycol (600) diacrylate; polyethylene glycol (600) dimethacrylate; polyethylene glycol 400 diacrylate; propoxylated (2) neopentyl glycol diacrylate; tetraethylene glycol diacrylate; tetraethylene glycol dimethacrylate; tricyclodecane dimethanol diacrylate; tricyclodecanedimethanol dimethacrylate; triethylene glycol diacrylate; triethylene glycol dimethacrylate; tripropylene glycol diacrylate; ethoxylated (15) trimethylolpropane triacrylate; ethoxylated (3) trimethylolpropane triacrylate; ethoxylated (6) trimethylolpropane triacrylate; ethoxylated (9) trimethylolpropane triacrylate; ethoxylated 5 pentaerythritol triacrylate; ethoxylated(20) trimethylolpropane triacrylate; propoxylated (3) glyceryl triacrylate; trimethylolpropane triacrylate; propoxylated (5.5) glyceryl triacrylate; pentaerythritol triacrylate; propoxylated (3) glyceryl triacrylate; propoxylated (3) trimethylolpropane triacrylate; trimethylolpropane triacrylate; trimethylolpropane trimethacrylate; tris (2-hydroxy ethyl) isocyanurate triacrylate; di-trimethylolpropane tetraacrylate; dipentaerythritol pentaacrylate; ethoxylated (4) pentaerythritol tetraacrylate; pentaerythritol tetraacrylate; dipentaerythritol hexaacrylate; 1,10 decanediol diacrylate; 1,3-butylene glycol diacrylate; 1,4-butanediol diacrylate; 1,9-nonanediol diacrylate; 2-(2-Vinyloxyethoxy)ethyl acrylate; 2-butyl-2-ethyl-1,3-propanediol diacrylate; 2-methyl-1,3-propanediol diacrylate; 2-methyl-1,3-propanediyl ethoxy acrylate; 3 methyl 1,5-pentanediol diacrylate; alkoxylated cyclohexane dimethanol diacrylate; alkoxylated hexanediol diacrylate; cyclohexane dimethanol diacrylate; ethoxylated cyclohexane dimethanol diacrylate; diethyleneglycol diacrylate; dioxane glycol diacrylate; ethoxylated dipentaerythritol hexaacrylate; ethoxylated glycerol triacrylate; ethoxylated neopentyl glycol diacrylate; hydroxypivalyl hydroxypivalate diacrylate; neopentyl glycol diacrylate; poly (tetramethylene glycol) diacrylate; polypropylene glycol 400 diacrylate; polypropylene glycol 700 diacrylate; propoxylated (6) ethoxylated bisphenol A diacrylate; propoxylated ethylene glycol diacrylate; propoxylated (5) pentaerythritol tetraacrylate; and propoxylated trimethylol propane triacrylate.

The inks may also contain other types of monomers such as N-vinyl amides. Examples of N-vinyl amides include N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methylacetamide(VIMA) and acryloyl morpholine (ACMO).

The inks may also contain vinyl ethers such as 2-(2-vinyloxyethoxy)ethylacrylate(VEEA), diethylene glycol divinyl ether(DVE2), triethylene glycol divinyl ether (DVE3),ethyl vinyl ether, n-butyl vinyl ether,iso-butyl vinyl ether, tert-butyl vinyl ether, cyclohexyl vinyl ether(CHVE), 2-ethylhexyl vinyl ether(EHVE),dodecyl vinyl ether (DDVE), octadecyl vinyl ether(ODVE), 1-2-butanediol divinyl ether(BDDVE), 1-4, cyclohexanedimethanol divinylether(CHDM-di), hydroxybutyl vinylether(HBVE), 1-4-cyclohexanedimethanolmono vinyl ether(CHDM-mono), 1,2,4-trivinylcyclohexane(TVCH), vinylphosphonic acid dimethylester(VPA) and vinylphosphonic acid dimethyl ester(VPADME).

The energy curable inks typically contain suitable photoinitiators, preferably in the amount of between 0.5 to 15% by weight, and advantageously between 1 and 10% by weight.

Suitable photoinitiators include a-hydroxyketones, such as 1-hydroxy-cyclohexyl-phenyl-ketone; 2-hydroxy-2-methyl-1-phenyl-1-propanone; 2-hydroxy-1-{4-[4-(2-hydroxy-2-methyl-propionyl)-benzyl]-phenyl}-2-methyl-propan-1-one; and 2-hydroxy-1-[4-(2-hydroxyethoxy)phenyl]-2-methyl-1-propanone.

Suitable photoinitiators may also include acylphosphine oxides such as 2, 4, 6-trimethylbenzoyl-diphenylphosphine oxide; 2, 4, 6-trimethylbenzoyl-diphenyl phosphinate; and bis (2, 4, 6-trimethylbenzoyl)-phenylphosphineoxide.

Additionally the photoinitiators may include aminoketones such as 2-methyl-1 [4-(methylthio)phenyl]-2-morpholinopropan-one; 2-benzyl-2-dimethylamino-1-(4-morpholinophenyl)-butanone-1; and 2-dimethylamino-2-(4-methyl-benzyl)-1-(4-morpholin-4-yl-phenyl)-butan-1-one.

Further examples of suitable photoinitiators include benzil dimethyl ketal; thioxanthone initiators 2-4-diethylthioxanthone; isopropylthioxanthone; 2-chlorothioxanthone; 1-chloro-4-propoxythioxanthone; benzophenone initiators benzophenone; 4-phenylbenzophenone; 4-methylbenzophenone; methyl-2-benzoylbenzoate; 4-benzoyl-4-methyldphenyl sulphide; phenylglyoxylate initiators phenyl glyoxylic acid methyl ester; oxy-phenyl-acetic acid 2-[2-hydroxy-ethoxy]-ethyl ester or oxy-phenyl-acetic acid 2-[2-oxo-2-phenyl-acetoxy-ethoxy]-ethyl ester; and titanocen radical initiator titanium bis(rj5-2,4-cyclopentadien-1-yl)bis[2,6-difluoro-3-(1 h-pyrrol-1-yl)phenyyl], oxime ester radical initiators, [1-(4 phenylsulfanylbenoyl)heptylideneamino]benzoate or [1-[9-ethyl-6-(2-methylbenzoyl)carbazol-3-yl] ethylideneamino] acetate, including methyl benzoylformate; 1-phenyl-1,2-propanedione-2-(o-ethoxycarbonyl)oxime, 4,4,4-(hexyamethyltriamino)triphenyl methane; 2-benzyl-2-dimethylamino-4-morpholinobutyrophenone; 2-methyl-1-(4-methylthiophenyl)-2-morpholineopropan-1-one; 4,4-bis (diethylamino)benzophenone; and 2-ethyl anthraquinone.

Polymeric photoinitiators are also suitable and include polymeric aminobenzoates (GENOPOL AB-1 or AB-2 from Rahn, Omnipol ASA from IGM or Speedcure 7040 from Lambson), polymeric benzophenone derivatives (GENOPOL BP-1 from Rahn, Omnipol BP from IGM or Speedcure 7005 from Lambson); and polymeric thioxanthone derivatives (GENOPOL TX-1 from RAHN, Omnipol TX from IGM or Speedcure 7010 from Lambson).

The inks may also include an amine synergist such as Ethyl-4-(dimethlamino)benzoate, 2-ethylhexyl-4-(dimethylamino)benzoate, 2-(dimethylamino)ethylbenzoate, poly[oxy(methyl 1,2-ethanediyl)], and a-[4-(dimethylamino)benzoyl-a-butoxy, butoxyethyl-4-(dimethylamino)benzoate.

Polymerizable oligomers such as epoxy acrylates, urethane acrylates, polyester acrylates, polyether acrylates or any other material containing a polymerizable functional group may also be included in the inks according to the present invention.

Furthermore the addition of passive resins to the inks can also be advantageous as these can be used to control the porosity of the coating. Typically acrylic based passive resins are preferred.

A stabilizer may also be used in the inks to ensure good pot life of the ink, examples of which are nitroxy based stabilizers such as OHTEMPO, TEMPO, and Irgastab UV10. Phenolic stabilizers such as hydroquinone (HQ), methyletherhydroquinone (MEHQ), butylhydroxytoluene (BHT) and 2,6-di-tert-butyl-N,N-dimethylamino-p-cresol. Nitrosophenylhydroxylamine(NPHA) base inhibitors NPHA, amine salts, and metal salts (Al salt, N-PAL) plus the aromatic amine inhibitors diphenylamine(DPA) and phenylenediamine(PPD). Other suitable stabilizers are florstab UV-1, UV-8, Genorad 16 and 18.

The ink may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and di sazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include azo dyes, anthraquinone dyes, xanthene dyes, azine dyes, combinations thereof and the like.

The inks may also include commercial organic pigments classified according to Colour Index International according to the following trade designations, blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109,PY110, PY113, PY128, PY129,PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments.

Typically the pigments are milled to less than 1 micrometer and preferably have a particle size distribution of between 10 to 500 nm, advantageously between 10-350 nm and this results in better transparency and a wide colour gamut.

The pigment usually is in the form of a dispersion which typically contains bewteen 60 to 90% by weight of monomer which can be a mono or multifunctional (meth)acrylate monomer, with added stabilizer, inhibitor, dispersant and optionally a pigment additive/synergist and/or a wetting additive/oligomer/resin.

The ratio of pigment to dispersant is typically between 1:2 to 9:1.

Examples of suitable dispersants include EFKA 7414, 7476, 7477, 7700, 7701, 7702, 7710, 7731 and 7732 available from BASF and SOLSPERSE 1700, 1900, 24000SC/GR, 26000, 32000, 33000, 35000, 36000, 39000, 41000 and 71000 available from LUBRIZOL,whilst examples of additive/synergists to aid dispersion stability include SOLSPERSE 5000, 12000 and 22000 from LUBRIZOL.

The inks may also include a suitable de-aerator which prevents the formation of air inclusions and pinholes in the cured coating. Furthermore these also reduce rectified diffusion, which can cause reliability issues in the printhead. Suitble examples include EVONIK: TEGO AIREX900, 910, 916, 920, 931, 936, 940, 944, 945, 950, 962, 980 and 986.

The present invention also provides a layered composite and a process for making a layered composite which comprises a) printing the energy curable ink on a substrate and b) curing the ink.

The printed inks and coating compositions may be be cured under the action of (actinic) electromagnetic radiation of various types including, electron-beam, UV light, visible light, laser light, infrared light and microwaves. Curing under the action of UV light is preferred and sources such as a high-voltage mercury bulb, a medium-voltage mercury bulb, a xenon bulb, a carbon arc lamp, a metal halide bulb, a UV LED lamp or sunlight, can be used.

The ink is advantageously ink jet printed onto the substrate and cured using UV radiation.

The inks of the present invention may be inkjet printed with a wide variety of printheads, such as those supplied by Ricoh, Xaar, Dimatix, Konica Minolta, Seiko, Samba, Kyocera, Toshiba Tec or SII Printex.

Advantageously the substrate is medium density fibre (MDF) and composite may also contain an overlay and/or underlay.

Typically the overlay and/or underlay comprises melamine and advantageously the underlay and/or overlay comprises melamine paper.

Finally the inks may also be used with a primer or an overprint varnish or with both a primer and an over print varnish.

The invention is further described by the examples given below.

EXAMPLES

A Xaar Hydra ink system and a XJ1001 GS6 print head running with a typical differential pressure of 100 mbar at 45° C. using the D844 Xaar waveform is used to assess the jetting of the inks. The head was mounted onto a web rig supplied by JF machines Ltd, which was run at 8-25 m/min depending on frequency. Head height was set to approximately 2 mm to exaggerate any nozzle directionality effects. Where measured drop mass is found by the weight of 1,000,000 drops printed into a plastic weighing boat lined with cloth to reduce static. All of the inventive examples were found to have satisfactory jetting performance.

Inks were weighed out according to the compositions below and stirred until homogeneous using a Silverson mixer.

Raw Materials
1. 2-Phenoxyethylacrylate ex Miwon
2. Acryloyl Morpholine ex Rahn
3. 4-hydroxybutylacrylate ex BASF
4. 1-Hydroxycyclohexyl Acetophenone ex IGM
5. Bis(2,4,6-trimethyl)phenyl Phosphineoxide ex BASF
6. 2,4-Diethylthioxanthone ex Lambson
7. 2,4,6-Trimethylbenzoylphenyl Phosphineoxide
8. Bomar BMA 200 Melamine acrylate ex Dymax
9. CN3755 Amino Acrylate ex Arkema
10. Trimethylcyclohexylacrylate ex Arkema
11. Photomer 5960 Amino Acrylate ex IGM
12. Irgastab UV25 Stabilizer ex BASF
13. UV V19 Magenta Paste ex SunChemical
14. Ebecryl LEO 10553 Amino Acrylate ex Allnex
15. Hexanedioldiacrylate ex Arkema
16. Dipentaerythritol hexaacrylate ex Arkema
17. Hydroxyethyl methacrylate ex Novasol Chemicals Table 1 Inkjet Examples:

Comparative Example C1 containing no amino acrylates or hydroxy functional acrylates; compared with Comparative Example C2 containing 5% of melamine acrylate; and Comparative Example C3 containing both amino and hydroxyl functional acrylates but with the non-volatile content of less than 45%.

The inventive Examples E1-E4 contain both amino acrylate and hydroxy functional acrylate monomer and have a non-volatile content of greater than 45%.

TABLE 1

| Material | C1 | C2 | C3 | E1 | E2 | E3 | E4 |
|---|---|---|---|---|---|---|---|
| Miramer M-140 (PHEA)[1] | 57.5 | 52.50 | 0.5 | 40.5 | 30.5 | 10.5 | 17.5 |
| ACMO[2] | 20.0 | 20.00 | 10.0 | 20.0 | 20.0 | 20.0 | 20.0 |
| 4-HBA[3] | | | 20.0 | 10.0 | 20.0 | 20.0 | 20.0 |
| Omnirad 481[4] | 2.00 | 2.00 | | | | | 2.0 |
| Irgacure 819[5] | 2.60 | 2.60 | 3.6 | 3.6 | 3.6 | 3.6 | 2.6 |
| Speedcure DETX[6] | 2.00 | 2.00 | 2.0 | 2.0 | 2.0 | 2.0 | 2.0 |
| Omnirad TPO[7] | 4.90 | 4.90 | 2.9 | 2.9 | 2.9 | 2.9 | 4.9 |
| Bomar BMA 200[8] | | 5.00 | | | | | |
| CN3755[9] | | | 10.0 | 10.0 | 10.0 | 10.0 | |
| TMCHA[10] | | | 40.0 | | | 20.0 | |
| Photomer 5960[11] | | | | | | | 20.0 |
| Irgastab UV25[12] | 1.00 | 1.00 | 1.00 | 1.0 | 1.0 | 1.0 | 1.0 |

TABLE 1-continued

| Material | C1 | C2 | C3 | E1 | E2 | E3 | E4 |
|---|---|---|---|---|---|---|---|
| UV Magenta Paste[13] | 10.0 | 10.00 | 10.00 | 10.0 | 10.0 | 10.0 | 10.0 |
| Total | 100.0 | 100.0 | 100.0 | 100.0 | 100.0 | 100.0 | 100.0 |
| Viscosity @40° C./Cp | 9.63 | 11.80 | 9.1 | 14.4 | 13.6 | 11.3 | 11.0 |
| Non-volatile content % | 79.1 | 79.8 | 39.7 | 79.5 | 77.6 | 49.9 | 82.7 |

Table 2 Inkjet Examples:

Inventive Examples E5-E9 containing between 3 to 50% by weight of amino acrylate plus hydroxy functional acrylate; and Comparative Examples C4-C5 containing greater than or equal to 60% by weight of amino acrylate.

TABLE 2

| Material | C4 | C5 | E5 | E6 | E7 | E8 | E9 |
|---|---|---|---|---|---|---|---|
| Miramer M-140 (PHEA)[1] | | | 34.5 | 22.5 | 7.5 | | |
| ACMO[2] | | | 20.0 | 20.0 | 20.0 | 17.5 | 7.5 |
| 4-HBA[3] | 17.5 | 7.5 | 20.0 | 20.0 | 20.0 | 20.0 | 20.0 |
| Omnirad 481[4] | 2.0 | 2.0 | 2.0 | 2.0 | 2.0 | 2.0 | 2.0 |
| Irgacure 819[5] | 2.6 | 2.6 | 2.6 | 2.6 | 2.6 | 2.6 | 2.6 |
| Speedcure DETX[6] | 2.0 | 2.0 | 2.0 | 2.0 | 2.0 | 2.0 | 2.0 |
| Omnirad TPO[7] | 4.9 | 4.9 | 4.9 | 4.9 | 4.9 | 4.9 | 4.9 |
| Ebecryl LEO10553[14] | 60.0 | 70.0 | 3.0 | 15.0 | 30.0 | 40.0 | 50.0 |
| Irgastab UV25[12] | 1.0 | 1.0 | 1.0 | 1.0 | 1.0 | 1.0 | 1.0 |
| UV Magenta Paste[13] | 10.0 | 10.0 | 10.0 | 10.0 | 10.0 | 10.0 | 10.0 |
| Total | 100.0 | 100.0 | 100.0 | 100.0 | 100.0 | 100.0 | 100.0 |
| Viscosity @40° C./Cp | 40.3 | 57.1 | 9.8 | 13.1 | 18.7 | 24.3 | 31.3 |
| Non-volatile content, % | 87.2 | 94.4 | 82.2 | 84.0 | 83.0 | 84.9 | 85.5 |

Table 3 Inkjet Examples:

Varying the crosslink density of inkjet formulations containing amino acrylates and hydroxy containing acrylate monomer. Comparative Example C6 has greater than 30% by weight of difunctional ethylenically unsaturated monomer; while inventive Examples E10-E14 have less than 30% by weight or less difunctional ethylenically unsaturated monomer.

E14 also contains 5% by weight of multifunctional ethylenically unsaturated monomer and inventive Examples E15-E18 contain between 1 to 10% by weight of multifunctional ethylenically unsaturated monomer.

TABLE 3

| Material | C6 | E10 | E11 | E12 | E13 | E14 | E15 | E16 | E17 | E18 |
|---|---|---|---|---|---|---|---|---|---|---|
| Miramer M-140 (PHEA)[1] | | 0.5 | 10.5 | 20.5 | 0.5 | | 29.5 | 27.5 | 25.5 | 20.5 |
| ACMO[2] | 10.5 | 20.0 | 20.0 | 20.0 | 20.0 | 15.5 | 20.0 | 20.0 | 20.0 | 20.0 |
| Irgacure 819[5] | 3.6 | 3.6 | 3.6 | 3.6 | 3.6 | 3.6 | 3.6 | 3.6 | 3.6 | 3.6 |
| Speedcure DETX[6] | 2.0 | 2.0 | 2.0 | 2.0 | 2.0 | 2.0 | 2.0 | 2.0 | 2.0 | 2.0 |

TABLE 3-continued

| Material | C6 | E10 | E11 | E12 | E13 | E14 | E15 | E16 | E17 | E18 |
|---|---|---|---|---|---|---|---|---|---|---|
| Omnirad TPO[7] | 2.9 | 2.9 | 2.9 | 2.9 | 2.9 | 2.9 | 2.9 | 2.9 | 2.9 | 2.9 |
| 4-HBA[3] | 20.0 | 20.0 | 20.0 | 20.0 | 20.0 | 20.0 | 20.0 | 20.0 | 20.0 | 20.0 |
| CN3755[9] | 10.0 | 10.0 | 10.0 | 10.0 | 10.0 | 10.0 | 10.0 | 10.0 | 10.0 | 10.0 |
| HDDA[15] | 40.0 | 30.0 | 20.0 | 10.0 | 20.0 | 30.0 | | | | |
| DPHA[16] | | | | | 10.0 | 5.0 | 1.0 | 3.0 | 5.0 | 10.0 |
| Irgastab UV25[12] | 1.0 | 1.0 | 1.0 | 1.0 | 1.0 | 1.0 | 1.0 | 1.0 | 1.0 | 1.0 |
| UV Magenta Paste[13] | 10.0 | 10.0 | 10.0 | 10.0 | 10.0 | 10.0 | 10.0 | 10.0 | 10.0 | 10.0 |
| Total | 100.0 | 100.0 | 100.0 | 100.0 | 100.0 | 100.0 | 100.0 | 100.0 | 100.0 | 100.0 |
| Viscosity @40° C./Cp | 11.4 | 12.7 | 12.9 | 13.7 | 19.2 | 15.9 | 15.0 | 14.0 | 13.7 | 16.2 |
| Non-volatile content, % | 86.6 | 85.6 | 83.5 | 78.3 | 80.4 | 86.3 | 75.7 | 74.5 | 81.4 | 75.3 |

Table 4 Inkjet Examples:

Inventive examples E19 to E23 containing 10% by weight of aminoacrylate and between 30 to 60% by weight of various hydroxyl functional (meth)acrylates.

| Material | E19 | E20 | E21 | E22 | E23 |
|---|---|---|---|---|---|
| Miramer M-140 (PHEA)[1] | 20.50 | 10.50 | 0.50 | | 30.50 |
| ACMO[2] | 20.00 | 20.00 | 20.00 | 10.50 | 20.00 |
| Irgacure 819[5] | 3.60 | 3.60 | 3.60 | 3.60 | 3.60 |
| Speedcure DETX[6] | 2.00 | 2.00 | 2.00 | 2.00 | 2.00 |
| Omnirad TPO[7] | 2.90 | 2.90 | 2.90 | 2.90 | 2.90 |
| 4-HBA[3] | 30.00 | 40.00 | 50.00 | 60.00 | |
| HEMA[17] | | | | | 20.00 |
| CN3755[9] | 10.00 | 10.00 | 10.00 | 10.00 | 10.00 |
| Irgastab UV 25[12] | 1.00 | 1.00 | 1.00 | 1.00 | 1.00 |
| UV Magenta Paste[13] | 10.00 | 10.00 | 10.00 | 10.00 | 10.00 |
| Total | 100.00 | 100.00 | 100.00 | 100.00 | 100.00 |
| Viscosity @40° C./cP | 14.1 | 13.9 | 13.8 | 13.6 | 13.4 |
| Non-volatile content/% | 70.9 | 71.3 | 73.4 | 76.8 | 64.6 |

Test Results

TABLE 5

Performance of the inks specified in Table 1 after lamination.

| Test | | C1 | C2 | C3 | E1 | E2 | E3 | E4 |
|---|---|---|---|---|---|---|---|---|
| Lamination | | Fail | Fail | Fail | 5 | 5 | 5 | 5 |
| Solvent resistance | Water | n/a | n/a | n/a | >100 | >100 | >100 | >100 |
| | Ethanol | n/a | n/a | n/a | >100 | >100 | >100 | >100 |
| | MEK | n/a | n/a | n/a | >100 | >100 | >100 | >100 |
| Cross-hatch adhesion | | n/a | n/a | n/a | 0 | 0 | 0 | 0 |
| Resistance to staining | Acetone | n/a | n/a | n/a | 5 | 5 | 5 | 5 |
| | Coffee | n/a | n/a | n/a | 5 | 5 | 5 | 5 |
| | Shoe polish | n/a | n/a | n/a | 5 | 5 | 5 | 5 |

Notes:

n/a = Due to severe delamination it was not possible to conduct further testing;

C1 and C2 failed lamination testing as the formulation did not contain amino acrylate and hydroxy functional acrylate monomer. C3 failed as the non-volatile content is <45%.

TABLE 6

Performance of the inks specified in Table 2 after lamination.

| Test | | C4 | C5 | E5 | E6 | E7 | E8 | E9 |
|---|---|---|---|---|---|---|---|---|
| Lamination | | 5 | 5 | 5 | 4 | 5 | 5 | 5 |
| Solvent resistance | Water | >100 | >100 | >100 | >100 | >100 | >100 | >100 |
| | Ethanol | >100 | >100 | >100 | >100 | >100 | >100 | >100 |
| | MEK | >100 | >100 | >100 | >100 | >100 | >100 | >100 |
| Cross-hatch adhesion | | 0 | 0 | 0 | 0 | 0 | 0 | 0 |
| Resistance to staining | Acetone | 5 | 5 | 5 | 5 | 5 | 5 | 5 |
| | Coffee | 5 | 5 | 5 | 5 | 5 | 5 | 5 |
| | Shoe polish | 5 | 5 | 5 | 5 | 5 | 5 | 5 |

All examples passed lamination testing but due to the high viscosity of C4 and C5, which contain greater than 60% by weight of amino acrylate, jetting was not possible.

TABLE 7

Performance results of the inks in Table 3 after lamination.

| Test | | C6 | E10 | E11 | E12 | E13 | E14 | E15 | E16 | E17 | E18 |
|---|---|---|---|---|---|---|---|---|---|---|---|
| Lamination | | Fail | 5 | 5 | 5 | 5 | 5 | 5 | 5 | 5 | 5 |
| Solvent resistance | Water | n/a | >100 | >100 | >100 | >100 | >100 | >100 | >100 | >100 | >100 |
| | Ethanol | n/a | >100 | >100 | >100 | >100 | >100 | >100 | >100 | >100 | >100 |
| | MEK | n/a | >100 | >100 | >100 | >100 | >100 | >100 | >100 | >100 | >100 |
| Cross-hatch adhesion | | n/a | 0 | 0 | 0 | 0 | 0 | 0 | 0 | 0 | 0 |
| Resistance to staining | Acetone | n/a | 5 | 5 | 5 | 5 | 4-5 | 5 | 5 | 5 | 5 |
| | Coffee | n/a | 5 | 5 | 5 | 5 | 5 | 5 | 5 | 5 | 5 |
| | Shoe polish | n/a | 5 | 5 | 5 | 5 | 4-5 | 4-5 | 4 | 4-5 | 5 |

Notes:
n/a = Due to severe delamination it was not possible to conduct further testing;
C6 which contains >30% ethylenically unsaturated difunctional monomer failed lamination testing.
Examples E10-18 all passed lamination testing containing 30% or less ethylenically unsaturated difunctional monomer and 10% or less multifunctional ethylenically unsaturated monomer.

TABLE 8

Performance results of the inks specified in Table 4 after lamination.

| Test | | E19 | E20 | E21 | E22 | E23 |
|---|---|---|---|---|---|---|
| Lamination | | 5 | 5 | 5 | 5 | 5 |
| Solvent resistance | Water | >100 | >100 | >100 | >100 | >100 |
| | Ethanol | >100 | >100 | >100 | >100 | >100 |
| | MEK | >100 | >100 | >100 | >100 | >100 |
| Cross-hatch adhesion | | 0 | 0 | 0 | 0 | 0 |
| Resistance to staining | Acetone | 5 | 5 | 5 | 5 | 5 |
| | Coffee | 5 | 5 | 5 | 5 | 5 |
| | Shoe polish | 5 | 5 | 5 | 5 | 5 |

Test Methods:
Procedure for Lamination
Apparatus:
  8-9 mm thick MDF board[17]
  50 mm wide aluminum foil adhesion tape[18]
  Melamine-impregnated white opaque underlay sheets[19]
  Melamine-impregnated overlay sheets[20]
  45 gsm untreated paper[21]
  PET film (~300 □ m thick)[22]
  RK control coater and UV curing rig (H-bulb)
  ILT490 UV light bug
  K-bar (e.g. 6 μm)
  Scissors
  Multilayer Moore press
  Press release papers[23]
  MDF board[24]

Key
17—ex Travis Perkins
18—ex RS Components
19—ex Schmid Gronau
20—ex Schmid Gronau
21—ex Ryman Stationers
22—ex Lyreco Stationers
23—ex Holders Technology Note: The Moore press should be switched on and the temperature set to 190° C. at least one hour before use.
Procedure for Preparing the Drawdown
1. Cut a sheet of 45gsm untreated paper to approximately 10×20 cm.
2. Place the paper on an RK Control Coater with a strip of PET film (~300 microns thick) across the top of the paper. (The PET film is used to contain the ink before being drawn down on the paper.)
3. Using the appropriate K-bar, apply a 6 micron drawdown of the ink on to the paper at an RK Coater Controller speed setting of 4.
4. Transfer the coated paper to the Fusion UV rig and using the H-bulb set the conveyor belt speed so the paper has a cure dose of 250mJ/cm$^2$. Put the paper through the UV rig a second time so the total dose is 2×250mJ/cm$^2$.

Figure 1:
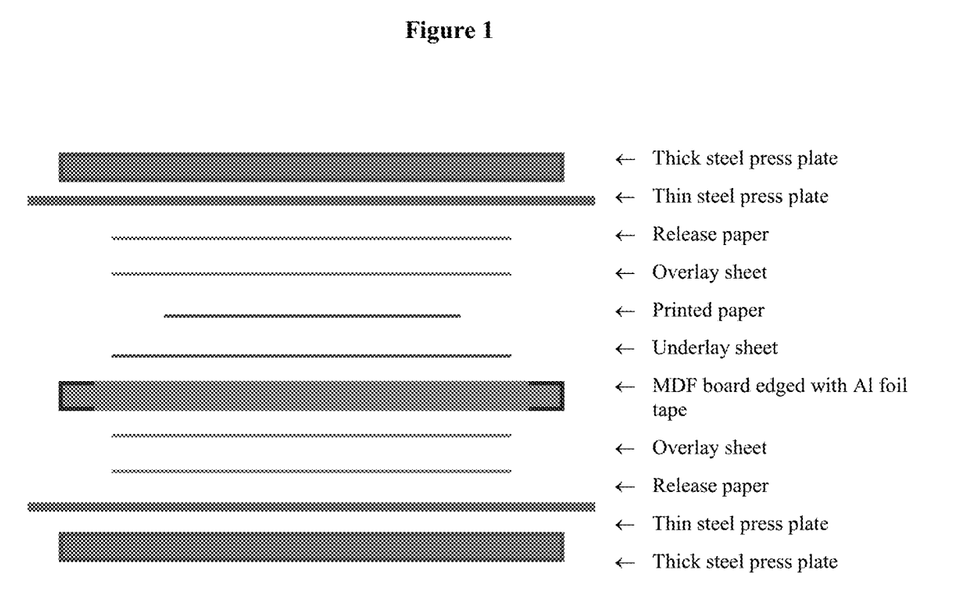
FIG. 1 shows the arrangement of press plates and materials for lamination.
Figure 2:
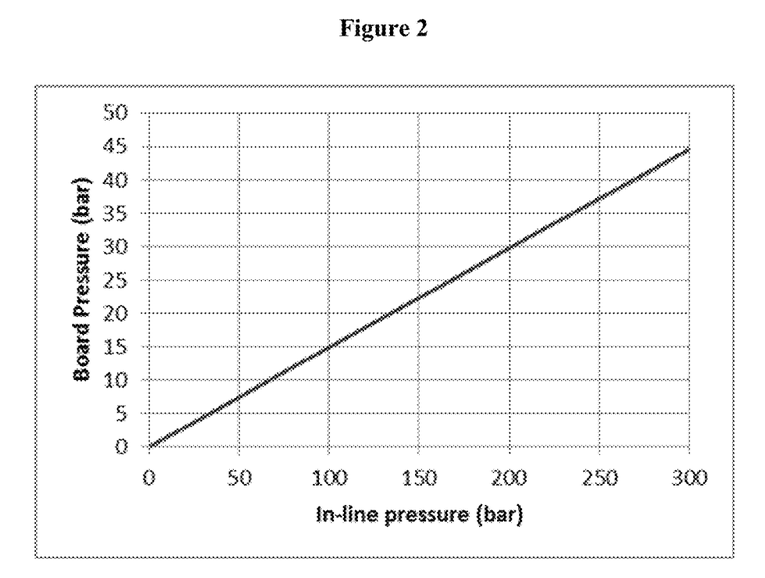
FIG. 2 shows a conversion chart for applied board pressure vs. in-line pressure for a 30 cm×30 cm board.

Procedure for Laminating the Sample
1. Seal the edges of the MDF board with adhesive aluminium tape, ensuring the tape overlaps the front and back faces by about 1 cm.
2. Layer the press plates and materials according to FIG. 1.
3. Close the press door and apply 150 bar line pressure at 190° C. for 20 seconds. For a 30×30 cm board this will result in about 22 bar applied board pressure. The conversion chart is shown below in FIG. 2 for a 30×30 cm board.

$$\text{Applied pressure} = \frac{\text{In-line pressure} \times 133.77}{\text{total board area (cm}^2\text{)}}$$

(133.77 = ram cross-sectional area, in cm$^2$)

4. Wearing heat resistant gloves remove the assembled layers from the press.
5. Wearing heat resistant gloves separate the layers and leave them to cool.
6. Leave at least 15 minutes before pressing the next board to allow the press plates to regain thermal equilibrium.

Performance Grading

The laminating performance of each ink is expressed according to the following grading scale:

Grade 5—No surface defects or blemishes
Grade 4—Blisters<1 mm, measured in any direction
Grade 3—Blisters between 1 mm and 2 cm measured in any direction
Grade 2—Blisters>2 cm measured in any direction
Grade 1—Burst blisters>2 cm measured in any direction
Fail—Adhesive failure of more than 10% of the surface Testing Procedures Solvent Resistance (Water, ethanol, MEK)

Apparatus:
  Test specimen: Impregnation laminated board
  cotton-tipped stick
  Solvent (water, ethanol, MEK)

Procedure:
1. Place the impregnation laminated board on a flat surface.
2. Select an area of the decorative surface of the test specimen that is free from blemishes.
3. Soak the cotton tip of the stick in the solvent.
4. Gently wipe the soaked cotton tip backwards and forwards across the selected area of the board.
5. Count how many times the cotton bud returns to the starting position ("double wipes") before the laminate surface starts to be affected.
6. Record the number of double wipes, up to a maximum of 100, achieved before the ink layer starts to break.
7. Repeat for each solvent: water; ethanol; MEK.

Cross-Hatch Adhesion

Apparatus:
  Test specimen: Impregnation laminated board
  Adhesive tape approved by ISO 2409[25]
  Rubber eraser
  Timer
  Sharp knife
  25—ex Elcometer Procedure:

The cross-hatch adhesion test is conducted in accordance with ISO 2409 "Paints and varnishes—cross-cut test":
1. Place the test specimen (impregnation laminated board) on a flat surface.
2. Select an area of the decorative surface of the test specimen that is free from blemishes.
3. Score a set of 6 parallel lines, approximately 20 cm long and 1 mm apart, across the selected area and deep enough to penetrate beneath the decorative ink layer.
4. Score another set of 6 parallel lines, approximately 20 cm long and 1 mm apart, perpendicular to the first set of lines and centered on their center.
5. Stick a 75 cm length of adhesive tape over the scored area, leaving one end of the tape unattached with which to remove it later.
6. Rub the surface of the tape gently with the rubber eraser to ensure even contact between the tape and surface of the test specimen.
7. Start the timer.
8. After 90 seconds remove the tape by seizing the free end and pulling the tape back on itself at approximately 180 degrees in a fast, even and continuous movement.
9. Inspect the scored area and record its performance according to the ISO 2409 grading scheme: 0=no removal, edges of the cuts are smooth; 5=more than 65% of the grid area has been removed.

Resistance to Staining

The resistance to staining test is conducted in accordance with BS EN438-2 § 26 Apparatus:
  Test specimen: Impregnation laminated board
  Staining agents (acetone, coffee, shoe polish)
  Timer
  Applicators (cotton-tipped stick, pipette)
  Tissue paper
  Cleaning solvents (water & ethanol)

Procedure:
1. Place the test specimen (impregnation laminated board) on a flat surface.
2. Select an area of the decorative surface of the test specimen that is free from blemishes.
3. Using a suitable applicator, apply the staining agent at the required test temperature to the selected test area.
4. Cover the test area with an aluminum dish to minimize evaporation.
5. Allow to stand at ambient temperature for the required time.
6. After the required time, remove the aluminum dish and wipe off the staining agent with tissue paper.
7. Clean the test area surface first with water, then with ethanol.
8. Allow to stand at ambient temperature for one hour before examining the test area surface with the unaided eye.
9. Asses the performance of the test specimen according to the following rating:

Grade 5: No visible change
Grade 4: Slight change in gloss and/or colour, visible only at certain viewing angles
Grade 3: Moderate change in gloss and/or colour
Grade 2: marked change in gloss and/or colour
Grade 1: blistering and/or distortion of the surface.

Procedure for Non-Volatile Determination

Apparatus:
  Aluminum pans (65 mm diameter)
  Analytical 5-point balance
  100° C. oven
  Pipettes Note: The oven should be set to 100° C. at least one hour before use, to ensure equilibration before use. Tests are carried out in duplicate.

Sample Preparation:
  Accurately record the weight (y) of a clean, empty aluminum pan to five decimal points and tare the balance.
  Accurately record the weight (z) of ca. 15 drops test ink (ca. 0.5 g) to five decimal points.
  Move the aluminum pans containing test ink to the 100° C. oven for a period of one hour.
  Remove the samples and reweigh the aluminum pans, accurately recording the weight (x) to five decimal points.

The non-volatiles content is calculated by use of the following general formula:

$$NVC = 100 + \left[\left(\frac{(x-y)-z}{z}\right) \times 100\right]$$

Where:

NVC is the 'non-volatiles content' in % x is the weight of the aluminum pan+sample after one hour in the 100° C.

y is the weight of the clean, empty aluminum pan z is the weight of the sample before drying Procedure for Viscosity Measurement Apparatus:
- Brookfield DV-II+ Pro viscometer
- Brookfield TC-650 water bath
- Test sample
- Pipettes Method:
- Set the water bath temperature to 40° C. and ensure that viscometer is calibrated with a suitable model fluid.
- Once equipment has stabilized at the required temperature, fill the sample cell with the test sample and fix it in place with the provided bolt, such that the spindle is submerged in the ink.
- Ensure that the ink level covers the spindle.
- Set the rotation speed of the spindle for 100 rpm and allow equilibration over a period of five minutes.
- Record the viscosity shown on the display.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. An energy curable ink comprising:
   (a) 3 to 50% by weight of amino acrylate derived from the reaction of an amine and an ethylenically unsaturated monomer;
   (b) 10 to 60% by weight of hydroxyl functional acrylate monomer; and
   (c) at least 7.5% by weight of one or more monofunctional ethylenically unsaturated monomers, difunctional ethylenically unsaturated monomers or multifunctional ethylenically unsaturated monomers;
   wherein non-volatile content of the energy curable ink is at least 45% by weight; the amine is selected from the group consisting of ethanolamine, ethylamine, diethylamine, triethylamine, monoisopropylamine, dipropylamine, dibutylamine, n-methyl ethanolamine, diethanolamine, diethylaminopropylamine (DEAPA), dimethylaminopropylaminopropylamine (DMAPAPA), 3-isopropoxypropylamine (IPOPA), 3-methoxypropylamine (MOPA), ethylmethylamine (EMA), tetramethylpropylenediamine (TMPDA), sec-butylamine, aminopropyldiethanolamine (APDEA), and combinations thereof; and the ethylenically unsaturated monomer of the amino acrylate is selected from the group consisting of propoxylated (PO3) glyceryl triacrylate (GPTA), ethoxylated trimethylolpropane triacrylate (TMPEOTA) where the level of ethoxylation varies from 3 to 20, hexanediol diacrylate (HDDA), tripropyleneglycol diacrylate (TPGDA), trimethylolpropane triacrylate (TMPTA), ethoxylated pentaerythritol tetraacrylate (PPTTA), 3-methyl 1, 5-pentanediol diacrylate (MPDDA) and combinations thereof.

2. The energy curable ink according to claim 1, further comprising at least one photoinitiator.

3. The energy curable ink according to claim 1, further comprising at least one colorant.

4. The energy curable ink according to claim 1, wherein the ethylenically unsaturated monomer of the amino acrylate is selected from the group consisting of hexanediol diacrylate (HDDA), tripropyleneglycol diacrylate (TPGDA), trimethylolpropane triacrylate (TMPTA), 3-methyl 1, 5-pentanediol diacrylate (MPDDA) and combinations thereof.

5. The energy curable ink according to claim 1, wherein the hydroxy functional acrylate monomer is selected from the group consisting of hydroxy butyl acrylate; hydroxy ethyl acrylate; hydroxy propyl acrylate, caprolactone acrylate and combinations thereof.

6. The energy curable ink according to claim 1, wherein the combined amount of difunctional and multifunctional ethylenically unsaturated monomers is no higher than 35%.

7. The energy curable ink according to claim 1, wherein at least one of the one or more multifunctional ethylenically unsaturated monomers are selected from the group consisting of:
   trimethylolpropane triacrylate; ethoxylated (3) trimethylolpropane triacrylate; propoxylated (3) glyceryl triacrylate; pentaerythritol triacrylate; propoxylated (3) glyceryl triacrylate; propoxylated (3) trimethylolpropane triacrylate; trimethylolpropane trimethacrylate; tris (2-hydroxyethyl) isocyanurate triacrylate; di-trimethylolpropane tetraacrylate; dipentaerythritol pentaacrylate; pentaerythritol tetraacrylate; dipentaerythritol hexaacrylate; ethoxylated dipentaerythritol hexaacrylate; and ethoxylated glycerol triacrylate.

8. The energy curable ink according to claim 1, wherein at least one of the one or more difunctional ethylenically unsaturated monomers are selected from the groups consisting of:
   1,3-butylene glycol dimethacrylate; 1,4-butanediol dimethacrylate; 1,6 hexanediol diacrylate; 1,6 hexanediol dimethacrylate; diethylene glycol dimethacrylate; dipropylene glycol diacrylate; ethoxylated (2) bisphenol A dimethacrylate; ethoxylated (3) bisphenol A diacrylate; ethoxylated (3) bisphenol A dimethacrylate; ethoxylated bisphenol A dimethacrylate; ethylene glycol dimethacrylate; propoxylated (2) neopentyl glycol diacrylate; tetraethylene glycol diacrylate; tetraethylene glycol dimethacrylate; tricyclodecane dimethanol diacrylate; tricyclodecanedimethanol dimethacrylate; triethylene glycol diacrylate; triethylene glycol dimethacrylate; tripropylene glycol diacrylate; 1,10 decanediol diacrylate; 1,3-butylene glycol diacrylate; 1,4-butanediol diacrylate; 1,9-nonanediol diacrylate; 2-(2-vinyloxyethoxy) ethyl acrylate; 2-butyl-2-ethyl-1,3-propanediol diacrylate; 2-methyl-1,3-propanediol diacrylate; 2-methyl-1,3-propanediyl ethoxy acrylate; 3 methyl 1,5-pentanediol diacrylate; alkoxylated cyclohexane dimethanol diacrylate; alkoxylated hexanediol diacrylate; cyclohexane dimethanol diacrylate; ethoxylated cyclohexane dimethanol diacrylate; diethyleneglycol diacrylate; dioxane glycol diacrylate; ethoxylated neopentyl glycol diacrylate; hydroxypivalyl hydroxypivalate diacrylate; neopentyl glycol diacrylate; diethylene glycol divinyl ether; triethylene glycol divinyl ether; 1-2-butanediol divinyl ether; and 1-4, cyclohexane dimethanol divinylether.

9. A layered composite comprising
   a) a substrate;
   b) a layer of the energy curable ink according to claim 1, on the substrate and;
   c) an overlay sheet positioned over the layer of the energy curable ink, wherein the substrate comprises medium density fiber (MDF) board and the ink is applied directly onto the substrate or applied to a decorative paper that is positioned over the substrate.

10. The layered composite according to claim 9, wherein the overlay sheet comprises melamine.

11. The layered composite according to claim 10, wherein the substrate further comprises an underlay sheet between the MDF board and the layer of energy curable ink.

12. The layered composite according to claim 11, wherein the underlay sheet comprises melamine.

13. The layered composite according to claim 11, wherein the underlay sheet and overlay sheet comprise melamine.

14. An energy curable ink comprising:
  (a) 3 to 50% by weight of amino acrylate;
  (b) 10 to 60% by weight of hydroxyl functional acrylate monomer; and
  (c) at least 7.5% by weight of one or more monomer selected from the group consisting monofunctional ethylenically unsaturated monomers, difunctional ethylenically unsaturated monomers or multifunctional ethylenically unsaturated monomers;
wherein non-volatile content of the energy curable ink is at least 45% by weight; wherein the amino acrylate is derived from an ethylenically unsaturated monomer selected from the group consisting of propoxylated (PO3) glyceryl triacrylate (GPTA), ethoxylated trimethylolpropane triacrylate (TMPEOTA) where the level of ethoxylation varies from 3 to 20, hexanediol diacrylate (HDDA), tripropyleneglycol diacrylate (TPGDA), trimethylolpropane triacrylate (TMPTA), ethoxylated pentaerythritol tetraacrylate (PPTTA), 3-methyl 1,5-pentanediol diacrylate (MPDDA) and combinations thereof.

15. The energy curable ink according to claim 14, further comprising a photoinitiator and a colorant, and wherein the amino acrylate is derived from an amine selected from the group consisting of ethanolamine, ethylamine, diethylamine, triethylamine, monoisopropylamine, dipropylamine, dibutylamine, n-methylethanolamine, diethanolamine, diethyl aminopropylamine (DEAPA), dimethylaminopropylaminopropylamine (DMAPAPA), 3-isopropoxypropylamine (IPOPA), 3-methoxypropylamine (MOPA), ethylmethylamine (EMA), tetramethylpropylenediamine (TMPDA), sec-butylamine, aminopropyldiethanolamine (APDEA), and combinations thereof.

16. A layered composite comprising
  a) a substrate;
  b) a layer of the energy curable ink according to claim 14, on the substrate and;
  c) an overlay sheet positioned over the layer of the energy curable ink,
wherein the substrate comprises medium density fiber (MDF) board and the ink is applied directly onto the substrate or applied to a decorative paper that is positioned over the substrate.

17. The layered composite according to claim 16, wherein the overlay sheet comprises melamine.

18. The layered composite according to claim 16, wherein the substrate further comprises an underlay sheet between the MDF board and the layer of energy curable ink.

19. The layered composite according to claim 16, wherein the underlay sheet comprises melamine.

* * * * *